No. 769,295. Patented September 6, 1904.

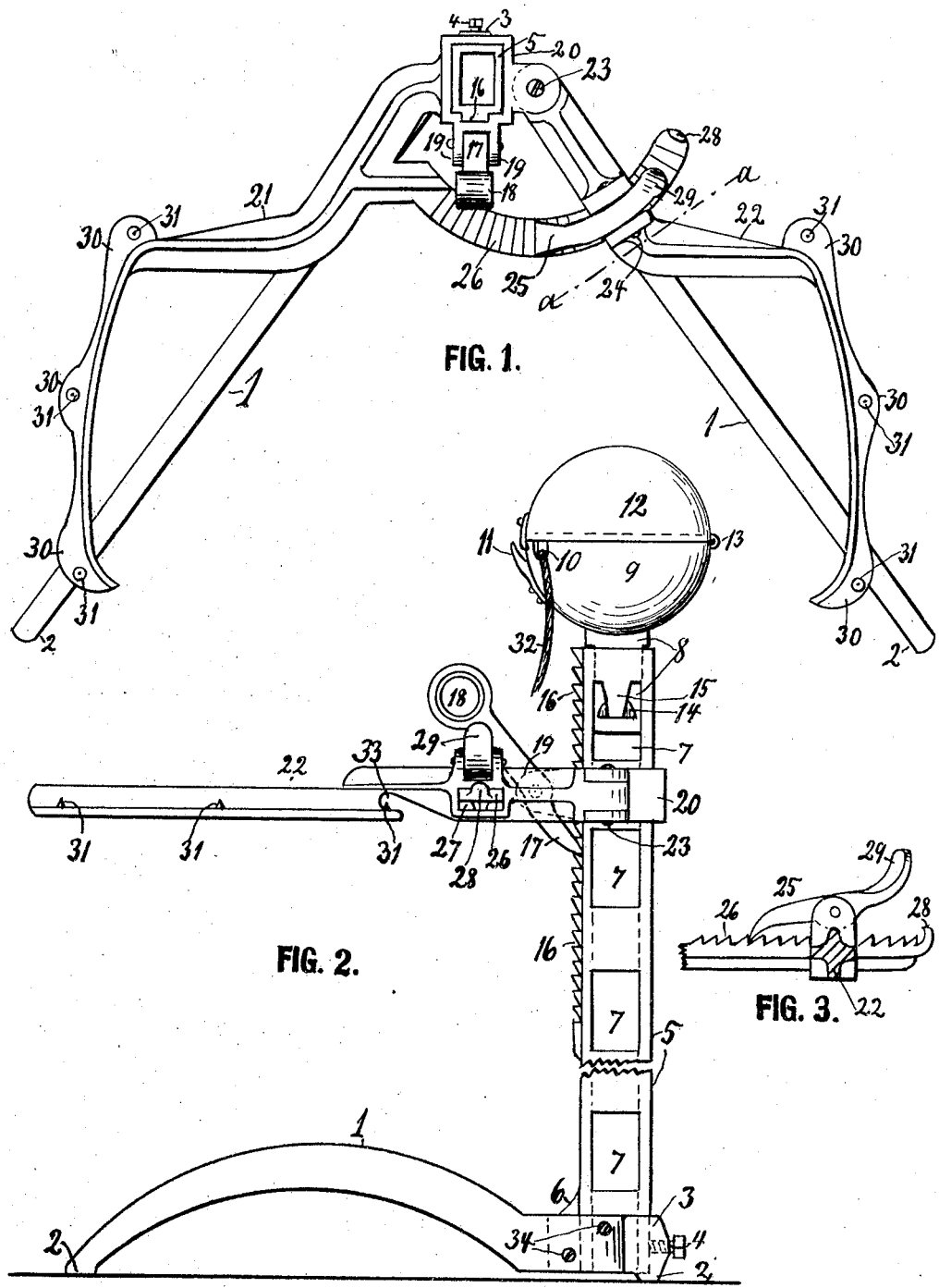

UNITED STATES PATENT OFFICE.

JOHN H. BELTZ, OF ST. PAUL, MINNESOTA.

SACK-HOLDER.

SPECIFICATION forming part of Letters Patent No. 769,295, dated September 6, 1904.

Application filed April 2, 1904. Serial No. 201,240. (No model.)

*To all whom it may concern:*

Be it known that I, JOHN H. BELTZ, a citizen of the United States, residing at St. Paul, in the county of Ramsey and State of Minnesota, have invented certain new and useful Improvements in Sack-Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in sack-holders; and the objects of the invention are to provide a complete, durable, and easily-operated device for holding sacks while they are being filled and to provide such device with means for holding and cutting off the twine used in closing and tying the sack. These and other objects I attain by the novel construction and arrangement of parts illustrated in the accompanying drawings, in which—

Figure 1 is a top view of my sack-holder with the twine-holder removed. Fig. 2 is a side elevation of the complete invention, including twine holder and cutter. Fig. 3 is a sectional front view on the line *a a* in Fig. 1.

Referring to the drawings by reference-numerals, a base-piece rests on three points 2 and is preferably formed of two angularly-disposed upwardly-arched arms or legs 1 1, at the junctions of which is formed a socket 3, in which is held by a set-screw 4 the tubular standard 5, resting with its projection 6 upon the socket. Said standard is preferably rectangular in cross-section and formed with opening 7 to lighten it when made of malleable or other casting. Into the open top of the standard is placed the stem 8 of a receptacle 9 adapted to hold a ball of twine, so that the end of the twine may project out of the opening 10 and be cut off by the knife 11, fixed on the receptacle. The receptacle is preferably spherical and formed with a lid or cover 12, hinged at 13 to the twine-holder proper, and the stem 8 of the latter has a side cavity 14, which engages the inward-bent springy tongue 15 of the standard, and thus holds the stem in place.

Preferably at the front side of the standard is provided a ratchet-rack 16, in which engages a dog 17, having a ring-shaped weight 18 to hold the dog engaged and to serve as a finger-hold in disengaging the dog when it is to be lowered. Said dog is pivoted between the lips 19 of a sliding sleeve or sliding piece 20, embracing loosely the standard and carrying at one side a preferably integral horizontal sack-supporting arm 21 and at the other side a similar arm 22, pivoted at 23, so as to swing in a horizontal plane. Upon said swinging arm is pivotally mounted at 24 a dog 25, engaging a segmental rack 26, which extends from the fixed arm 21 through a guiding-aperture 27 in the pivoted arm and at its end has a stop 28 to prevent the pivoted arm from swinging too far out. Said stop is preferably cast with the rack of malleable iron and bent upward after the rack is inserted through the arm. The dog 25 is preferably held engaged with the rack by its gravity. The upper end of the dog 25 is flattened and turned upward to form a handy thumb-catch 29, which the operator presses out and downward with his thumb, so as to disengage the dog, while the fingers of the same hand engage the pivoted arm 22 and swing it inward to release the sack, which is suspended and held open by placing its top seam or edge upon the horizontal projections 30 of the arms 21 22 and spreading said arms as much as the sack will permit and let the dog 25 engage and hold the arms in the spread position. In places where old sacks with torn tops are used I provide the projecting flanges 30 with upwardly-projecting prongs 31, by which to engage any part of the sack. When the sack is filled, the twine 32 is used to tie it with and cut off on the knife 11.

It will be understood that the dog 17 supports the arms 21 22 at any desired elevation, so that the sack may merely touch the floor while empty, and when filled it will stand on the floor or ground, partly steadied by the bow-shaped base-arms or legs 1. In order to bring the rear edge of the sack to the same height as the front edge, the supporting-arms 21 22 are offset downward at the points 33, as shown in Fig. 2.

One of the legs 1 may be secured in place by screws 34.

From the above description the construction and use of the sack-holder will be understood, so it needs only be said further that in storing and shipping the device it may be knocked down, so as to occupy a very small space, by lowering the arms 21 22 down upon the legs 1, and by loosening the screw 4 the standard may be taken out of the socket 3 and put horizontally upon the other parts. The twine-holder 9 may also have its stem unlocked and removed from the standard to place it centrally among the other parts, and if it be desired to further knock down the device then the pivot-screw 23 and the screws 34 will permit of detaching one upper and one lower arm and placing them parallel with the opposite arms and the standard.

Having thus described my invention, what I claim, and desire to secure by Letters Patent, is—

1. In a sack-holder, the combination with a suitable base and a standard secured in the base and having at one side a rack, of a sliding piece embracing the standard and having a pivoted dog normally engaging the rack to support the sliding piece at various elevations, and two horizontally-disposed arms carried by the sliding piece and adapted to hold a sack in a suspended and open position, one of said arms being fixed and having a horizontally-disposed rack projecting from it, the other sack-supporting arm being pivoted to swing horizontally, and carrying a dog normally engaging the said rack to keep the arms spread into contact with the inner sides of the top of the sack.

2. In a sack-holder, the combination with a suitable base and a standard secured in the base and having at one side a rack, of a sliding piece embracing the standard and having a pivoted dog normally engaging the rack to support the sliding piece at various elevations, and two horizontally-disposed arms carried by the sliding piece and adapted to hold a sack in a suspended and open position, one of said arms being fixed and having a horizontally-disposed rack projecting from it, the other sack-supporting arm being pivoted to swing horizontally, and carrying a dog normally engaging the said rack to keep the arms spread into contact with the inner sides of the top of the sack, both of said dogs being held in engagement by their weight and provided with suitable finger-holds for disengaging them from the racks.

3. In a sack-holder the combination with a suitable base and a standard secured in the base and having at one side a rack, of a sliding piece embracing the standard and having a pivoted dog normally engaging the rack to support the sliding piece at various elevations, and two horizontally-disposed arms carried by the sliding piece and adapted to hold a sack in a suspended and open position, one of said arms being fixed and having a horizontally-disposed rack projecting from it, the other sack-supporting arm being pivoted to swing horizontally, and carrying a dog normally engaging the said rack to keep the arms spread into contact with the inner sides of the top of the sack, said horizontal rack passing through an aperture in the pivoted arm and having means at its free end for limiting the spreading of the pivoted arm.

In testimony whereof I affix my signature in presence of two witnesses.

JOHN H. BELTZ.

Witnesses:
A. M. CARLSEN,
D. E. CARLSEN.